Sept. 13, 1960 J. D. TEAR ET AL 2,952,846

MISSILE VELOCITY INDICATING SYSTEM

Filed April 17, 1957 7 Sheets-Sheet 1

INVENTORS
JAMES D. TEAR
JOSEPH V. D'ONOFRIO
HENRY F. McKENNEY
ROBERT D. GROSS
FREDERICK J. McKEOWN
BY Victor D. Borst
ATTORNEY INVENTORS
JAMES D. TEAR
JOSEPH V. D'ONOFRIO
HENRY F. McKENNEY
ROBERT D. GROSS
FREDERICK J. McKEOWN
BY Victor D. Borst
ATTORNEY.

INVENTORS
JAMES D. TEAR
JOSEPH V. D'ONOFRIO
HENRY F. McKENNEY
ROBERT D. GROSS
FREDERICK J. McKEOWN
BY Victor D. Bosch
ATTORNEY

MISSILE VELOCITY INDICATING SYSTEM

Filed April 17, 1957 7 Sheets-Sheet 4

INVENTORS
JAMES D. TEAR
JOSEPH V. D'ONOFRIO
HENRY F. McKENNEY
ROBERT D. GROSS
FREDERICK J. McKEOWN

BY Victor D. Borst
ATTORNEY

MISSILE VELOCITY INDICATING SYSTEM

Filed April 17, 1957 7 Sheets-Sheet 5

INVENTORS
JAMES D. TEAR
JOSEPH V. D'ONOFRIO
HENRY F. McKENNEY
ROBERT D. GROSS
FREDERICK J. McKEOWN
BY Victor D. Borst
ATTORNEY INVENTORS
JAMES D. TEAR
JOSEPH V. D'ONOFRIO
HENRY F. McKENNEY
ROBERT D. GROSS
FREDERICK J. McKEOWN BY Victor D. Borst ATTORNEY $$A=(V_{1B}-V_{2B})\left(\frac{R}{2L}-\frac{1}{2}\cos\phi\sin\theta\right)$$

$$B=(V_{1A}-V_{2A})\left(\frac{R}{2L}-\frac{1}{2}\cos\phi\cos\theta\right)$$

$$V_R=\frac{V_{1A}+V_{1B}+V_{2A}+V_{2B}}{4}$$

$$V_x=A+V_R\cos\phi\sin\theta$$

$$V_y=B+V_R\cos\phi\cos\theta$$

$$V_z=V_R\sin\phi-\frac{1}{\sin\phi}(A\cos\phi\sin\theta+B\cos\phi\cos\theta)$$

$$V=\sqrt{V_x^2+V_y^2+V_z^2}$$

United States Patent Office 2,952,846

Patented Sept. 13, 1960

2,952,846

MISSILE VELOCITY INDICATING SYSTEM

James D. Tear, Great Neck, and Joseph V. D'Onofrio, Hicksville, N.Y., Henry F. McKenney, Weston, Mass., and Robert D. Gross, New York, and Frederick J. McKeown, Brooklyn, N.Y., assignors to Sperry Rand Corporation, Ford Instrument Company Division, Long Island City, N.Y., a corporation of Delaware Filed Apr. 17, 1957, Ser. No. 653,499

10 Claims. (Cl. 343—7)

This invention relates to aircraft telemetering systems and more particularly to a system for measuring the velocity of an airborne missile from a ground station location.

Many conventional systems for obtaining the velocity of an airborne missile from measurements at a single ground station relay on differentiating techniques performed upon available radar data for successive positions of the missile in flight. The velocity determining accuracy of such systems is known to be poor since differentiating systems provide the velocity of the missile by dividing a small displacement of the airborne missile by the small time interval for such displacement. Obviously small errors in the numerator and/or denominator can result in larger errors in the quotient. As a means of increasing the accuracy of conventional distance measuring systems, data is often obtained from a plurality of ground stations positioned along a preselected missile flight path in short and long base line systems. Neither the single station nor base line systems can yield instantaneously the missile velocities because of the need to determine a change in distance over a finite interval of time. Even such systems which incorporate automatic computers require approximately two to ten seconds for the complex differentiating computations. Delays of this order seriously limit the desirable range safety function. In long baseline systems, it is not uncommon to have the computation time extend into weeks for the desired solutions.

A principal object of this invention is to provide a new system for automatically and continuously indicating the three rectangular velocity components of an airborne missile from a single ground station having a short base line configuration of antennas.

Another object of the invention is to provide a new system for indicating the velocity of an airborne missile from a ground station location, wherein the velocity data is provided and displayed for the missile substantially at the instant of its occurrence.

Another object of the invention is to provide a new system for more accurately measuring the velocity of an airborne missile from a ground station location.

Still another object of this invention is to provide a new system for indicating the velocity of an airborne missile from a ground station having a short base line configuration of antennas and an improved automatic computer component.

In general the invention resides in the utilization of Doppler effect measurements which are directly proportional to the missile velocity components. As contemplated, a high frequency oscillator with its associated antenna, control circuits and power supply is installed on an airborne missile, the oscillator having a high degree of frequency stability. At a ground station location, there are provided four antennas 1A, 2A, 1B and 2B in a short base line configuration to receive the continuous wave transmission from the oscillator in the airborne missile. Antennas 1A and 2A are positioned along a north-south base line while the 1B and 2B antennas are positioned along an intersecting east-west base line, the four antennas being equally spaced from the point of intersection of the base lines. Generally, the frequency of the transmission from the oscillator on the airborne missile as received by the two pairs of base line antennas is different for each antenna, the frequency being determined by the Doppler effect as a consequence of the different radial velocities of the missile relative to each of the antenna locations. In the proposed circuitry, base line equipment connected to each base line pair of antennas includes receivers to demodulate the Doppler frequencies and associated circuitry to measure the Doppler frequencies. The signals from the base line equipment represent the Doppler components which are directly proportional to radial velocity components $V_{1A}$ and $V_{1B}$ and to the difference of the radial velocity components $(V_{1A}-V_{2A})$ and $(V_{1B}-V_{2B})$, wherein $V_{1A}$, $V_{2A}$, $V_{1B}$ and $V_{2B}$ are the radial velocities of the airborne missile relative to the four antenna positions. Instrumentation radar at or near the origin of the intersecting base lines provides the range distance $r$, the elevation angle $\phi$ and the azimuth angle $\theta$ of the missile. Additionally, the radar directs and slaves the four antennas through electromechanical servo systems for improving the reception at the antenna. In the event that the radar antenna is displaced from the base line origin, a parallax computer is provided to compensate for the off-origin distances and angles. The seven continuously available quantities $V_{1A}$, $V_{1B}$, $(V_{1A}-V_{2A})$, $(V_{1B}-V_{2B})$, $r$, $\phi$ and $\theta$ are channeled to two computers, viz., a digital computer to obtain ballistic data and an analog computer for range safety data.

In the disclosure of the invention a new and relatively simple analog computer is instrumentated to automatically yield the missile velocity components $V_x$ (longitude), $V_y$ (latitude) and $V_z$ (altitude) in accordance with the following formulas which will be derived hereinafter:

$$V_x=(V_{1B}-V_{2B})\left[\frac{R}{2L}-\frac{1}{2}\cos\phi\sin\theta\right]+V_R\cos\phi\sin\theta$$

$$V_y=(V_{1A}-V_{2A})\left[\frac{R}{2L}-\frac{1}{2}\cos\phi\cos\theta\right]+V_R\cos\phi\cos\theta$$

$$V_z=V_R\sin\phi$$

$$-\frac{1}{\sin\phi}\left[(V_{1B}-V_{2B})\left(\frac{R}{2L}-\frac{1}{2}\cos\phi\sin\theta\right)(\cos\phi\sin\theta)+(V_{1A}-V_{2A})\left(\frac{R}{2L}-\frac{1}{2}\cos\phi\cos\theta\right)\right]$$

wherein, $$V_R=\frac{V_{1A}+V_{2A}+V_{1B}+V_{2B}}{4}$$

2L=distance between antennas on same base line.

In this disclosure two embodiments of the base line equipment will be described. Base line equipment A for the north-south antennas is identical with the base line equipment B for the east-west antennas and in one embodiment each base line equipment comprises two receivers connected to their associated antennas, two electronic counters to yield digital outputs and two converters to yield analog outputs. The transmission from the airborne missile as received by the two antennas in each base line system is mixed, filtered and amplified in the base line receivers and then channeled to two counter networks, one network yielding the digital velocity and direction of $V_{1A}$ by counting the number of Doppler cycles in a finite interval of time and the other network yielding the digital time quantity $T_{1A-2A}$ and its algebraic sign. The quantities $T_{1A-2A}$ for the first base line equipment and $T_{1B-2B}$ for the second base line equipment represent the difference in the Doppler frequencies of the transmission received by the two antennas in each base line system by measuring the time intervals for a finite number of Doppler difference cycles. These quantities are related to the desired quantities $(V_{1A}-V_{2A})$ and $(V_{1B}-V_{2B})$ in accordance with the parameters of a specific system. In the proposed circuitry, velocity directions for $V_{1A}$, $V_{1B}$, $(V_{1A}-V_{2A})$ and $(V_{1B}-V_{2B})$ are determined by the introduction of bias frequencies from local oscillators. For data processing in the range safety analog computer, the digital output from the counting networks is converted to analog quantities by converter circuitry.

In another embodiment of the base line equipment, dynamic measurements are made on a standing wave system connected to the two antennas along each base line. As contemplated, one end section of a variable microwave phase shifter, which is connected to one antenna through a wave guide, converts the linearly polarized waves into circularly polarized waves. The rotatable section of the phase shifter reverses the direction of the circularly polarized waves of the first section and delays the signal in accordance with its angular position. The other end section of the phase shifter restores the wave to linear polarization. The angular position of the rotary phase shifter is controlled by a follow-up servo mechanism system and a probe inserted into a wave guide section connected between the third section of the phase shifter and the second baseline antenna will provide the null sensing element for the servo system. A differentiating circuit energized by a response potentiometer in the servo system will yield the difference of the radial velocities of the missile relative to each antenna in the pair of antennas. The radial velocity of the missile relative to one antenna is measured in similar microwave circuitry by substituting a stable high frequency oscillator for one antenna in each pair of antennas, the frequency of the oscillator being equal to the frequency of the oscillator in the airborne missile.

The features of the invention will be understood more clearly from the following detailed description taken in conjunction with the accompanying drawings in which.

Figure 4:
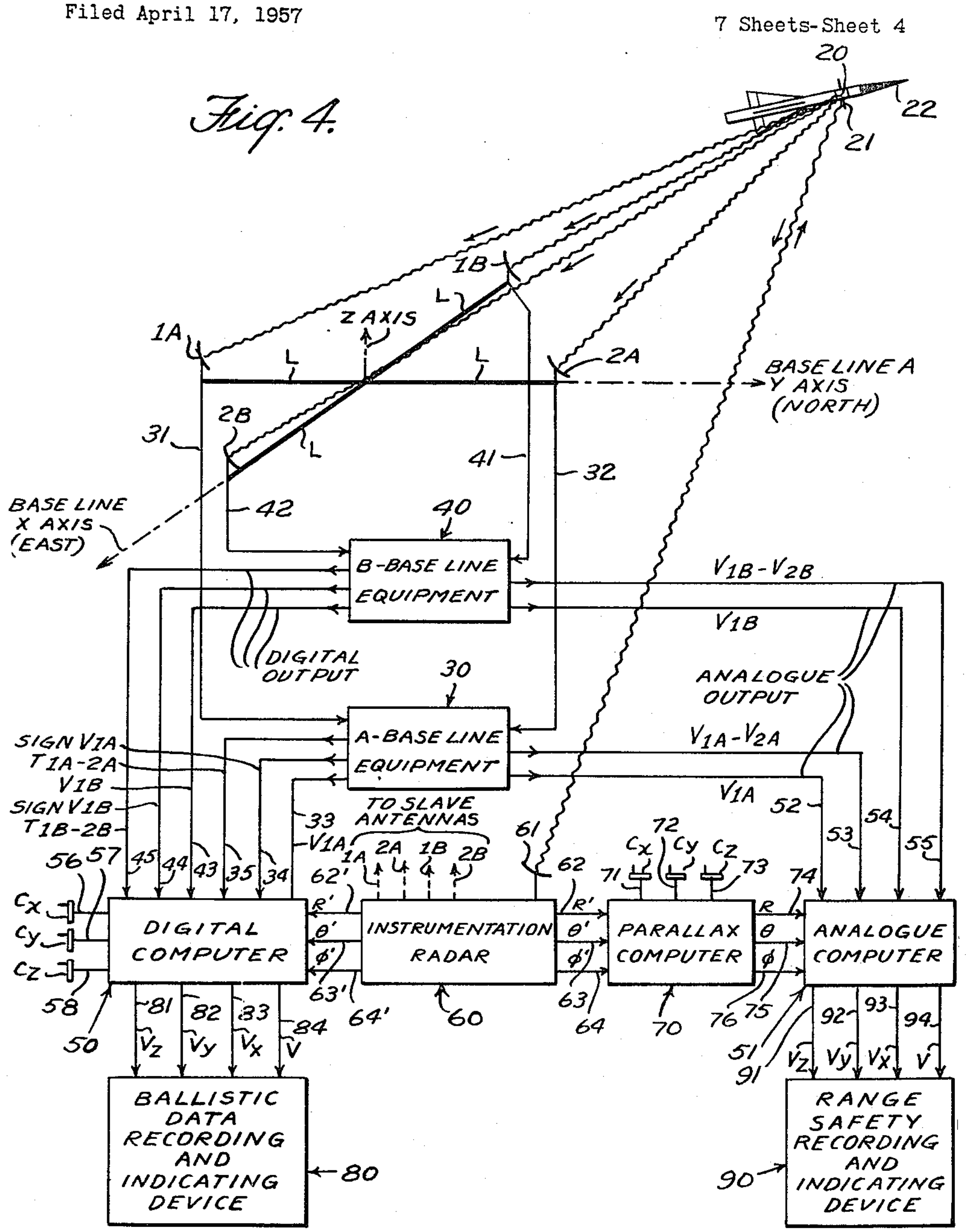
Fig. 4 is a block diagram of the new missile velocity measuring system.

Figs. 7*a*, 7*b*, 7*c*, 7*d* and 7*e* are block diagrams of the analog computer in Fig. 4.

Figure 1:
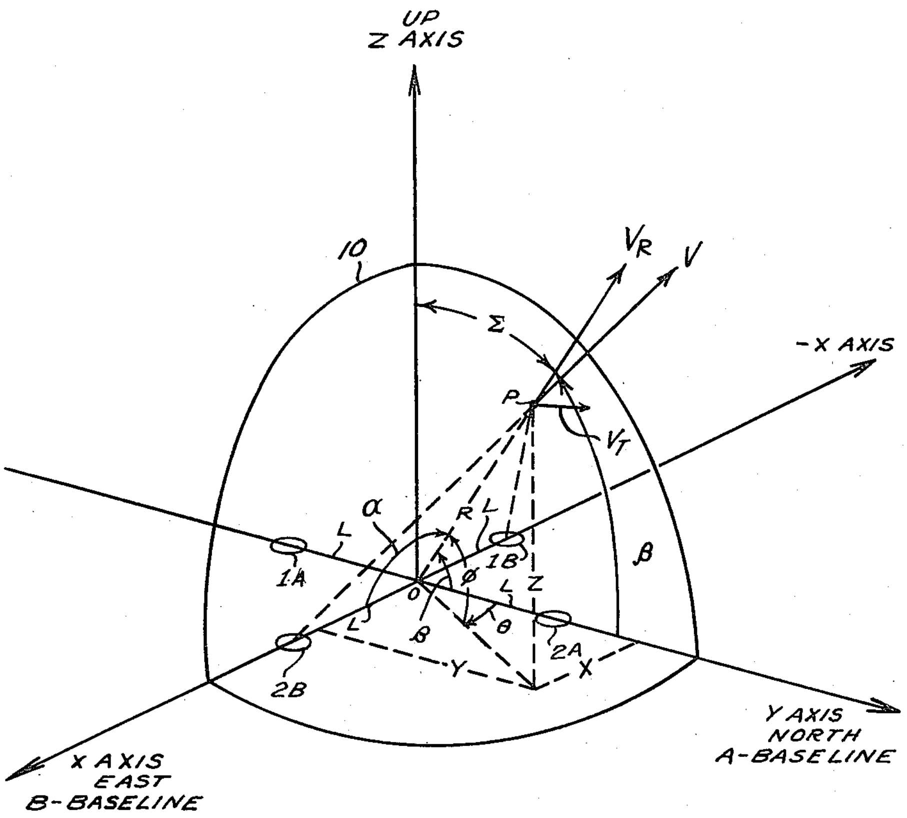
Fig. 1 is a three dimensional diagram of the geometry of an airborne missile relative to two pairs of antennas at a ground station location.

Referring to the three dimensional diagram in Fig. 1, a pair of receiving antennas 1A and 2A are disposed in a ground plane and along a north-south base line, each antenna being located at a distance L from an origin O on the base line. Another pair of receiving antennas 1B and 2B are disposed in the ground plane and along an east-west base line through the origin O, each antenna being located at a distance L from the origin O. For convenience the base lines are established in a three dimensional rectangular coordinate system having an X axis referenced in the east direction, a Y axis referenced in the north direction and a Z axis referenced in the zenith direction. An airborne missile at point P which is displaced at a range distance R from the origin O has an instantaneous velocity represented by the vector V. In this short base line configuration, the range distance R is appreciably greater than the separation distance 2L between the antennas in either base line. Point P lies on sphere 10 having its center at the origin O and the missile velocity vector V relative to this sphere 10 has a radial component $V_R$ and a tangential component $V_T$. The rectangular coordinates of point P are $x$, $y$ and $z$ and its polar vector along the distance R has an angle $\alpha$ with the X axis, an angle $\beta$ with the Y axis and an angle $\Sigma$ with the Z axis. The point P at range R can also be located by an azimuth angle $\theta$ measured from the Y axis and an elevation angle $\phi$ measured from the ground plane.

Figure 2:
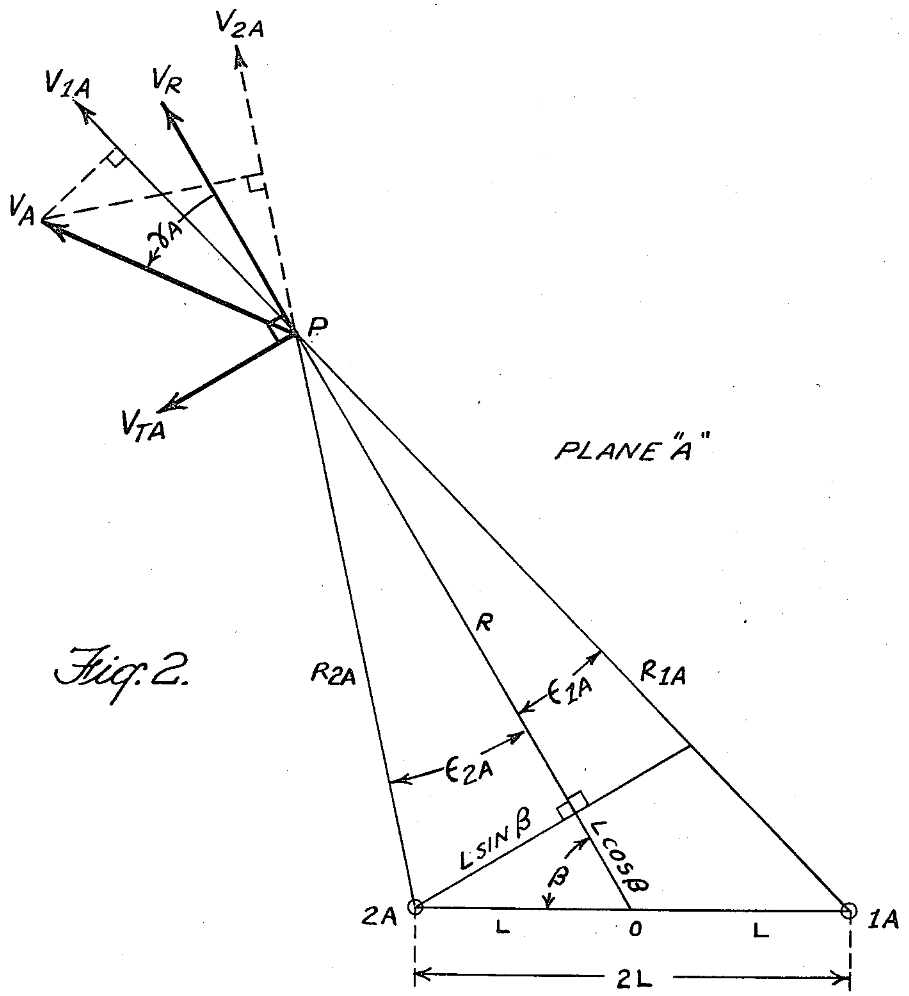
Fig. 2 is a two dimensional diagram of the geometry of Fig. 1 in plane "A" passing through the A-base line and the position of the airborne missile.
Figure 3:
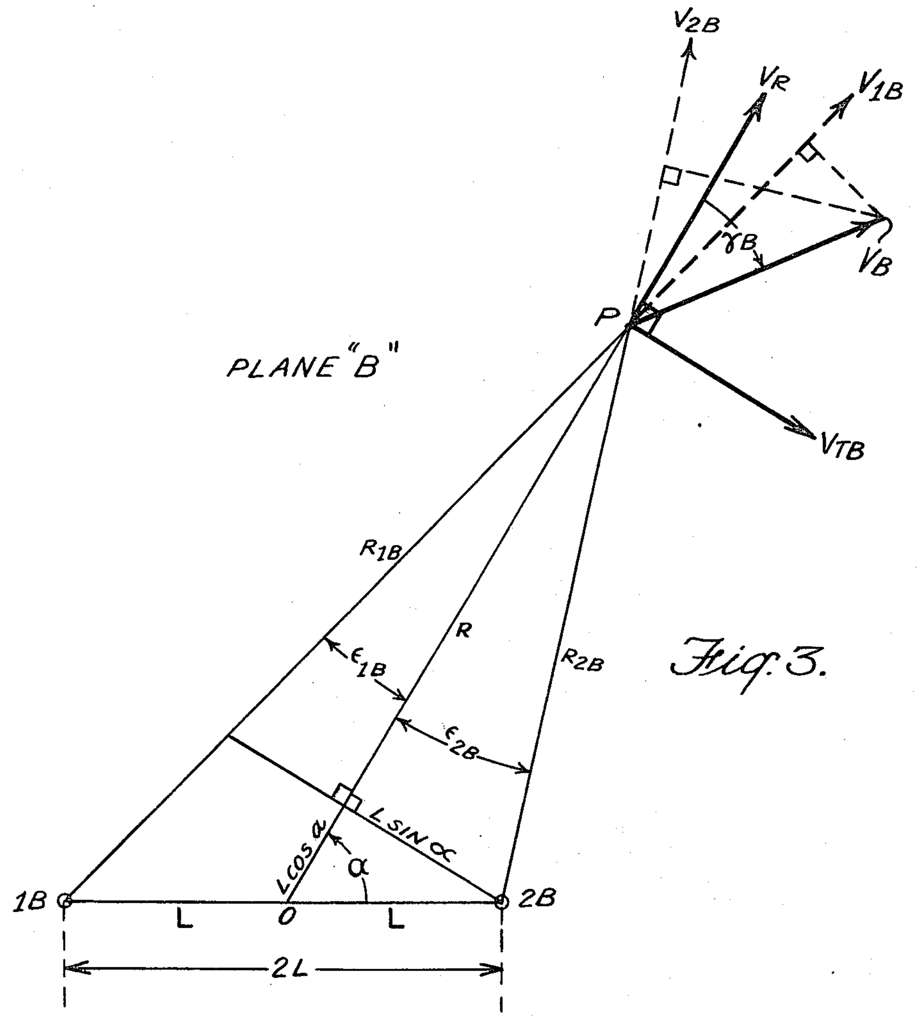
Fig. 3 is a two dimensional diagram of the geometry of Fig. 1 in a plane "B" passing through the B-base line and the position of the airborne missile.

The geometry of Figs. 1 in plane "A" and plane "B" which pass through the point P and the Y axis and X axis respectively are shown in Figs. 2 and 3.

From the geometrical relationships in Fig. 1, $$x=R\cos\phi\sin\theta=R\cos\alpha \tag{1}$$

$$y=R\cos\phi\cos\theta=R\cos\beta \tag{2}$$

$$z=R\sin\phi=R\cos\Sigma \tag{3}$$

Differentiating Equations 1, 2 and 3

$$V_x=-R\dot{\alpha}\sin\alpha+V_R\cos\alpha \tag{4}$$

$$V_y=-R\dot{\beta}\sin\beta+V_R\cos\beta \tag{5}$$

$$V_z=-R\dot{\Sigma}\sin\Sigma+V_R\cos\Sigma \tag{6}$$

From Fig. 2, by the law of cosines, $$(R_{1A})^2=R^2+L^2-2RL\cos(180-\beta)$$

$$(R_{1A})^2=R^2+L^2+2RL\cos\beta$$

$$(R_{2A})^2=R^2+L^2-2RL\cos\beta$$

wherein $R_{1A}$ and $R_{2A}$ are the ranges of point P from point positions 1A and 2A respectively.

Using the law of sines, $$\frac{\sin E_{1A}}{L}=\frac{\sin(180-\beta)}{R_{1A}}=\frac{\sin\beta}{R_{1A}}$$

$$\frac{\sin E_{2A}}{L}=\frac{\sin\beta}{R_{2A}}$$

therefore $$\sin E_{1A}=\frac{L\sin\beta}{\sqrt{R^2+L^2+2RL\cos\beta}} \tag{7}$$

$$\sin E_{2A}=\frac{L\sin\beta}{\sqrt{R^2+L^2-2RL\cos\beta}} \tag{8}$$

From the equality, $\cos^2 E=1-\sin^2 E$ $$\cos E_{1A}=\frac{R+L\cos\beta}{\sqrt{R^2+L^2+2RL\cos\beta}}$$

$$\cos E_{2A}=\frac{R-L\cos\beta}{\sqrt{R^2+L^2-2RL\cos\beta}}$$

then, $$(\sin E_{1A}+\sin E_{2A})=\sin\beta\left[\frac{L}{\sqrt{R^2+L^2+2RL\cos\beta}}+\frac{L}{\sqrt{R^2+L^2-2RL\cos\beta}}\right]$$

$$(\cos E_{1A}-\cos E_{2A})=\frac{R+L\cos\beta}{\sqrt{R^2+L^2+2RL\cos\beta}}-\frac{R-L\cos\beta}{\sqrt{R^2+L^2-2RL\cos\beta}}$$

also, $$V_{1A}=V_A\cos(\gamma_A-E_{1A})=V_A\cos\gamma_A\cos E_{1A}+V_A\sin\gamma_A\sin E_{1A}$$

$$V_{2A}=V_A \cos(\gamma_A+E_{2A})=V_A \cos \gamma_A \cos E_{2A}-V_A \sin \gamma_A \sin E_{2A}$$

$$(V_{1A}-V_{2A})=V_A \cos \gamma_A(\cos E_{1A}-\cos E_{2A})+V_A \sin \gamma_A(\sin E_{1A}+\sin E_{2A})$$

but $$V_A \cos \gamma_A=V_R$$

$$V_A \sin \gamma_A=V_{TA}$$

$$V_{TA}=\frac{(V_{1A}-V_{2A})-V_R(\cos E_{1A}-\cos E_{2A})}{\sin E_{1A}+\sin E_{2A}}$$

or, $$V_{TA} \sin \beta=\frac{(V_{1A}-V_{2A})-V_R\left[\frac{R+L \cos \beta}{\sqrt{R^2+L^2+2RL \cos \beta}}-\frac{R-L \cos \beta}{\sqrt{R^2+L^2-2RL \cos \beta}}\right]}{\frac{L}{\sqrt{R^2+L^2+2RL \cos \beta}}+\frac{L}{\sqrt{R^2+L^2-2RL \cos \beta}}}$$

also from Fig. 2

$$V_{TA}=-R\beta$$

therefore, $$V_y=\beta+V_R \cos \beta \qquad (9)$$

wherein, $$\beta=\frac{(V_{1A}-V_{2A})-V_R\left[\frac{R+L \cos \beta}{\sqrt{R^2+L^2+2RL \cos \beta}}-\frac{R-L \cos \beta}{\sqrt{R^2+L^2-2RL \cos \beta}}\right]}{\frac{L}{\sqrt{R^2+L^2+2RL \cos \beta}}+\frac{L}{\sqrt{R^2+L^2-2RL \cos \beta}}} \qquad (10)$$

Now, from the relationships in Equation 2

$$\beta=(V_{1A}-V_{2A})\left[\frac{R}{2L}-\frac{1}{2} \cos \phi \cos \theta\right] \qquad (11)$$

and $$V_y=\beta+V_R \cos \phi \cos \theta \qquad (12)$$

Similarly, using Fig. 3

$$(V_{1B}-V_{2B})=V_B \cos \gamma B(\cos E_{1B}-\cos E_{2B}) + V_B \sin \gamma B(\sin E_{1B}+\sin E_{2B})$$

$$V_{TB}=\frac{(V_{1B}-V_{2B})-V_R(\cos E_{1B}-\cos E_{2B})}{\sin E_{1B}+\sin E_{2B}}$$

$$V_{TB}=-R\dot{\alpha}$$

and therefore, $$V_x=A+V_R \cos \alpha \qquad (13)$$

wherein $$\frac{A}{\alpha}=\frac{(V_{1B}-V_{2B})-V_R\left[\frac{R+L \cos \alpha}{\sqrt{R+L+2RL \cos \alpha}}-\frac{R-L \cos \alpha}{\sqrt{R+L-2RL \cos \alpha}}\right]}{\frac{L}{\sqrt{R^2+L^2+2RL \cos \alpha}}+\frac{L}{\sqrt{R^2+L^2-2RL \cos \alpha}}}$$

Now from the relationships in Equation 1

$$\frac{A}{\alpha}=(V_{1B}-V_{2B})\left[\frac{R}{2L}-\frac{1}{2} \cos \phi \sin \theta\right] \qquad (15)$$

and $$V_x=A+V \cos \phi \sin \theta \qquad (16)$$

To solve for $V_z$, $$\cos^2 \alpha+\cos^2 \beta+\cos^2 \Sigma=1$$

or $$\Sigma=\cos^{-1} \sqrt{1-\cos^2 \alpha-\cos^2 \beta}$$

Differentiating $$-\dot{\Sigma}=\frac{(1-\cos^2 \alpha-\cos^2 \beta)-½}{\sqrt{1-(1-\cos^2 \alpha-\cos^2 \beta)}}[\dot{\alpha} \cos \alpha \sin \alpha+\beta \cos \beta \sin \beta]$$

but, $$(1-\cos^2 \alpha-\cos^2 \beta)-½=1/\cos \Sigma$$

$$\sqrt{1-(1-\cos^2 \alpha-\cos^2 \beta)}=\sin \Sigma$$

Let $$A=-R\dot{\alpha} \sin \alpha$$

$$B=-R\dot{\beta} \sin \beta$$

and from Equations 4 and 5

$$V_z=\frac{-1}{\cos \Sigma}[A \cos \alpha+B \cos \beta]+V_R \cos \Sigma \qquad (17)$$

now from the relationship in Equation 3

$$V_z=V_R \sin \phi \frac{-1}{\sin \phi}(A \cos \phi \sin \theta+B \cos \phi \cos \theta) \qquad (18)$$

For a short base line configuration in which R is much greater than L, the distances $R_{1A}$, $R_{2A}$, $R_{1B}$ and $R_{2B}$ are approximately equal and for such a condition, $$V_R=\frac{V_{1A}+V_{1B}+V_{2A}+V_{2B}}{4} \qquad (19)$$

In Fig. 4 is shown a block diagram of a missile velocity system which implements the new theory of operation as derived hereinbefore. A stable high frequency oscillator 20 having a transmitting antenna 21 is disposed on an airborne missile 22. Four receiving antennas 1A, 2A, 1B and 2B are positioned at a ground station in accordance with the geometry of Fig. 1, antenna 1A and 2A being disposed along base line A and antennas 1B and 2B being disposed along base line B. Antennas 1A and 2A are connected to A-base line equipment 30 by cables 31 and 32, respectively. The A-base line equipment has a digital and an analog output which yields signals directly proportional to the radial velocity $V_{1A}$ of the missile 22 relative to the antenna 1A and the difference in radial velocities $(V_{1A}-V_{2A})$ of the missile 22 relative to the two antennas in the base line A. B-base line equipment 40 is identical to A-base line equipment 30, the B-base line equipment being connected to antennas 1B and 2B by cables 41 and 42 so as yield the radial velocity $V_{1B}$ of the missile 22 relative to antenna 1B and the difference in radial velocities $(V_{1B}-V_{2B})$ of the missile 22 relative to the two antennas in base line B. As a practical expedient, the velocities $V_{1A}$ and $V_{1B}$ can be measured by counting the number of Doppler frequency cycles in a fixed time interval and the velocity differences $(V_{1A}-V_{2A})$ and $(V_{1B}-V_{2B})$ can be measured by time intervals $T_{1A-2A}$ and $T_{1B-2B}$ required for a finite number of Doppler difference frequency cycles. The digital outputs of $V_{1A}$, sign of $V_{1A}$ and $T_{1A-2A}$ from A-base line equipment 30 and the digital outputs of $V_{1B}$, sign $V_{1B}$ and $T_{1B-2B}$ from B-base line equipment 40 are channeled to a digital computer 50 by cables 33, 34, 35, 43, 44 and 45, respectively, connected therebetween. The analog outputs of $V_{1A}$ and $(V_{1A}-V_{2A})$ from A-base line equipment 30 and the analog outputs of $V_{1B}$ and $(V_{1B}-V_{2B})$ from B-base line equipment 40 are channeled to an analog computer 51 by cables 52, 53, and 54, 55, respectively, connected therebetween.

An instrumentation radar system 60 having an antenna 61 located at the ground station position to track the missile 22 in flight. The radar system continuously yields the range R' in cables 62 and 62', the azimuth angle $\theta'$ in cables 63 and 63' and the elevation angle $\phi'$ in cables 64 and 64'. The radar sytem 60 also slaves and points the four antennas 1A, 2A, 1B and 2B at the missile 22 by servomechanism systems (not shown) for maximizing the reception from the oscillator 20. In the event that the antenna 61 of the radar system 60 cannot be located at the base line origin O, a parallax computer 70 is provided to correct for the off-distances and off-angles corresponding to the off position of the radar antenna 61 from the origin O, the parallax computer being connected at its input side to the cables 62, 63 and 64 from the radar system 60. The parallax computer 70 receives the off-distance position of the radar antenna 61 from the origin O through shaft 71 for the $x$ ordinate displacement, through shaft 72 for the $y$ ordinate displacement and through shaft 73 for the $z$ ordinate displacement, the output of the parallax computer 70 yielding the true range R, true azimuth angle $\theta$ and true elevation angle $\phi$ of the missile 22 as referenced from the origin O in its output cables 74, 75 and 76, respectively. The cables 62', 63' and 64' having the uncorrected range R', uncorrected azimuth $\theta'$ and uncorrected elevation angle $\phi'$ are connected to the other input side of the digital computer 50, the digital computer having its own parallax computer incorporated therein with provision to receive the off-distance corrections of the radar antenna 61 from the origin O through shafts 56, 57 and 58. The output side of the digital computer 50 is connected to a Ballistic Data Recording and Indicating device 80 by cables 81, 82, 83 and 84, the digital computer yielding the velocity V of missile 22 and its three coordinate components $V_x$, $V_y$ and $V_z$.

The analog computer 51 is connected on its other input side to the cables 74, 75 and 76 so as to receive the true R, $\theta$ and $\phi$ quantities from the instrumentation radar system 60. The output side of the analog computer 51 is connected to a Range Safety Recording and Indicating device 90 by cables 91, 92, 93 and 94, the analog computer yielding the instantaneous velocity V of the airborne missile 22 and its three coordinate components $V_x$, $V_y$ and $V_z$.

Figure 5:
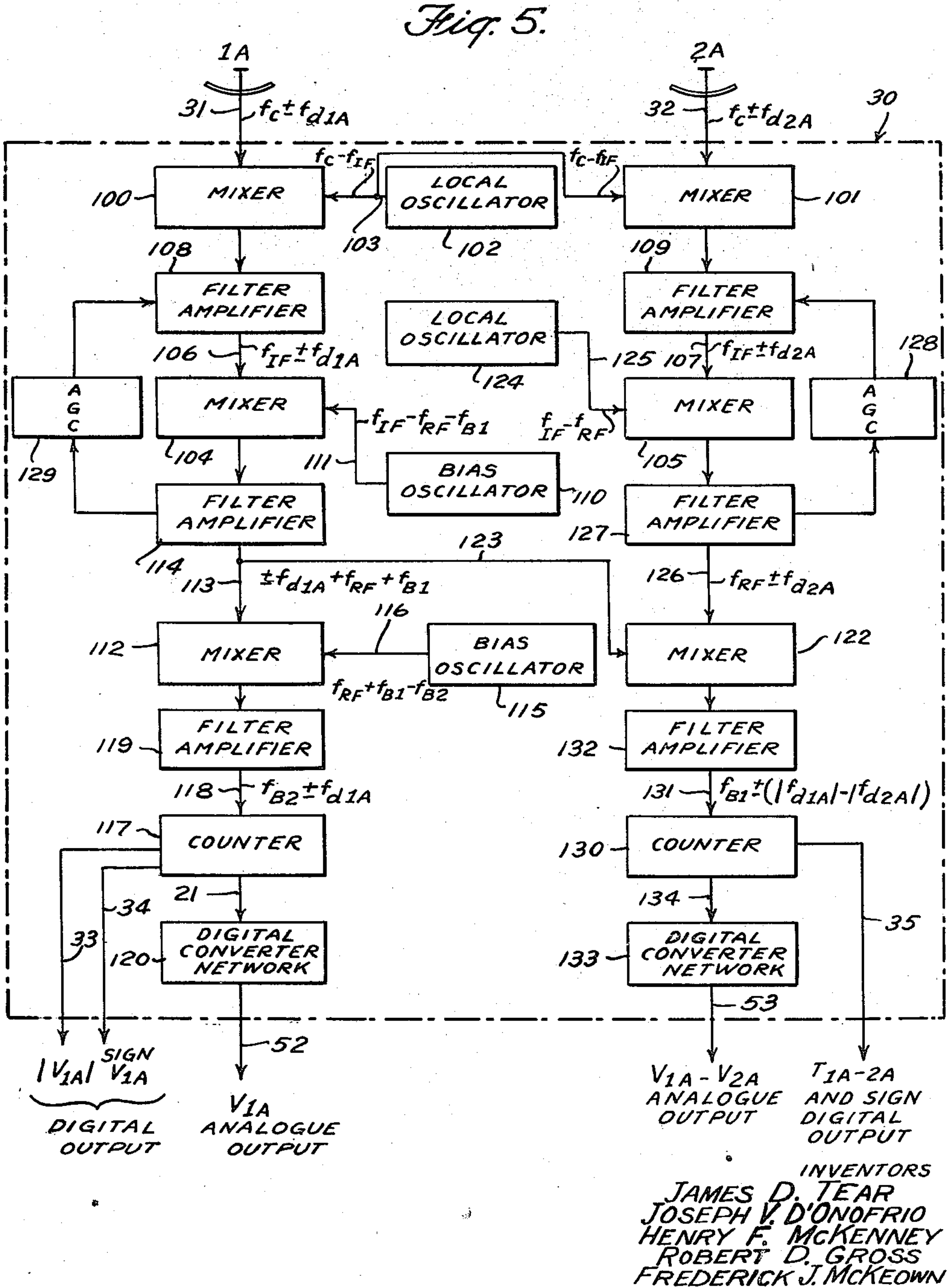
Fig. 5 is a block diagram of one embodiment of the base line equipment in Fig. 4.

Fig. 5 is one embodiment in block diagram of the A-base line equipment 30, the B-base line equipment 40 being similar to the hereinafter disclosed A-base line equipment. The antennas 1A and 2A receive electromagnetic energy of frequency $(f_c \pm f_{d1A})$ and $(f_c \pm f_{d2A})$, wherein $f_c$ is the frequency of the oscillator 20 in the airborne missile 22, $f_{d1A}$ is the Doppler frequency received by antenna 1A, and $f_{d2A}$ is the Doppler frequency received by antenna 2A, the plus or minus sign being governed by whether the missile is flying towards the antenna or way from the antenna, respectively. Antennas 1A and 2A are connected through the cables 31 and 32 to mixers 100 and 101, respectively. A local oscillator 102 having a frequency $(f_c - f_{IF})$ is connected in beating relationship to the mixers 100 and 101 by a cable 103, the frequency $f_{IF}$ being a convenient lower intermediate frequency. The output sides of mixers 100 and 101 having the informational quantities $(f_{IF} \pm f_{d1A})$ and $(f_{IF} \pm f_{d2A})$ are connected to mixers 104 and 105 by cables 106 and 107 through filter-amplifiers 108 and 109, respectively. A bias oscillator 110 having a frequency of $(f_{IF} - f_{RF} - f_{B1})$ is connected in beating relationship to the mixer 104 by a cable 111, wherein $f_{B1}$ is a first bias frequency to establish the plus or minus sign of the quantity $\pm (f_{d1A} - f_{d2A})$ and $F_{RF}$ is a convenient lower frequency than $f_{IF}$. The output side of the mixer 104 having the informational quantity $$\left( \pm f \frac{1}{diA} + f_{RF} + f_{B1} \right)$$

is connected to a mixer 112 by a cable 113 through a filter-amplifier 114. A second bias oscillator 115 having a frequency $(f_{RF} + f_{B1} - f_{B2})$ is connected in beating relationship to the mixer 112 by a cable 116, wherein $f_{B2}$ is a second bias frequency to establish the plus or minus sign of the quantity $\pm f_{d1A}$. The output of the mixer 112 having the informational quantity $(f_{B2} \pm f_{d1A})$ is connected to the input side of a frequency cycle counter network 117 by a cable 118 through a filter-amplifier 119. The counter network 117 measures the radial velocity $V_{1A}$ of the missile 22 relative to the antenna 1A by counting the number of input Doppler cycles in a finite time interval. The digital output $V_{1A}$ and sign of $V_{1A}$ of network 117 is connected to the cables 33 and 34 of digital computer 50 and to a digital-to-analog converter 120 by a cable 121. The analog output $V_{1A}$ of converter 120 is connected to the cable 52 of the analog computer 51.

The output side of the filter-amplifier 114 is additionally connected in beating relationship to a mixer 122 by a cable 123. A local oscillator 124 having a frequency $(f_{IF} - f_{RF})$ is connected in beating relationship to the mixer 105 by a cable 125. The output of the mixer 105 having the informational quantity $(f_{RF} - f_{d2A})$ is connected to the input side of the mixer 122 by a cable 126 through a filter-amplifier 127. Automatic gain control circuits 128 and 129 are connected between the filter-amplifiers 127 and 109 and between the filter-amplifiers 114 and 108, respectively, for stabilizing the circuitry of the base line equipment. The output of the mixer 122 having the informational intelligence $f_{B1} \pm (f_{d1A} - f_{d2A})$ is connected to a frequency period counter network 130 by a cable 131 through a filter-amplifier 132. The counter 130 measures the difference in radical velocities $(V_{1A} - V_{2A})$ of the missile relative to the antennas 1A and 2A by measuring the time period $T_{1A-2A}$ for counting a preselected number of Doppler difference frequency cycles received by the antennas 1A and 2A as a consequence of the radial movement of the missile 22 relative thereto. The digital output $T_{1A-2A}$ of the network 130 is connected to the cable 35 of the digital computer 50 and to a digital-to-analog computer 133 by a cable 134. The analog output $(V_{1A} - V_{2A})$ of converter 133 is connected to the cable 53 of analog computer 51.

As an example of practical circuit values and parameters for the embodiment disclosed in Figs. 1, 2, 3, 4 and 5, the selected frequency $f_c$ of the airborne oscillator 20 may be 12,000 megacycles per second when it is desired to measure the velocity of the missile 22 having a velocity in the range of zero to 15,000 feet per second. The Doppler frequency $f_d$ relative to any of the antennas 1A, 2A, 1B or 2B would then vary 12 cycles per second for each foot per second of missile radial velocity $V_R$ in accordance with the formula, $$f_d = \frac{V_R f_c}{C}$$

wherein $C$=speed of light in feet per second (approx. $1 \times 10^9$).

Since the missile can be in-coming or out-going relative to any antenna, the direction of travel must be known. As the received frequency decreases when the missile is out-going and increases when the missile is in-coming, the direction of travel may be determined from the Doppler measurement. By allowing the Doppler frequency shift of $\pm 180$ kilocycles to vary about a second bias frequency $f_{B2}$ of 320 kilocycles, the frequency to be counted by the counter network 117 will always be positive and less than 1 megacycle, thereby simplifying the counter mechanism.

The Doppler frequency shift $(f_{d1A} - f_{d2A})$ is employed to measure the difference in Doppler velocities $(V_{1A} - V_{2A})$ of the missile 22 relative to the antennas 1A and 2A. For the selected parameters, the Doppler difference frequency is 12 cycles per second for each foot per second of difference in velocity when the base length L is 100 yards, the difference in radial velocity varying between 0.001 and 30 feet per second. Since the measurement of difference in radial velocity is actually in terms of angular velocity, the clockwise or counterclockwise movement of the missile relative to the origin O must be determined. This can be determined by employing a first bias frequency $f_{B1}$ of 2740 cycles per second. The values of $(f_{d1A}-f_{d2A})$ and $(f_{d1B}-f_{d2B})$ will then normally vary between 2380 and 3100 cycles per second for the selected parameters of the system.

From the formula $f=n/t_n$ wherein $t_n$ represents the time required to count $n$ cycles, it appears that two methods are available for determining the frequency $f$. Either $t_n$ may be preselected and $n$ measured, or $n$ may be predetermined and $t_n$ measured. When highest accuracy is desired, it is advisable to use frequency cycle counting at high frequencies and frequency period counting at low frequencies. For the preselected parameters of the disclosed system, the counting network 117 counts the number of Doppler cycles received by antenna 1A in 0.0416 seconds and the counting network measures the Doppler difference time interval $(T_{1A-2A})$ in seconds for counting 100 cycles of the Doppler shift frequency. For the chosen parameters:

$$V_{1A}-V_{2A}=\frac{25}{3}\frac{1}{T_{1A-2A}}-27.4$$

and $$V_{1B}-V_{2B}=\frac{25}{3}\frac{1}{T_{1B}-T_{2B}}-27.4$$

Figures 6, 6A:
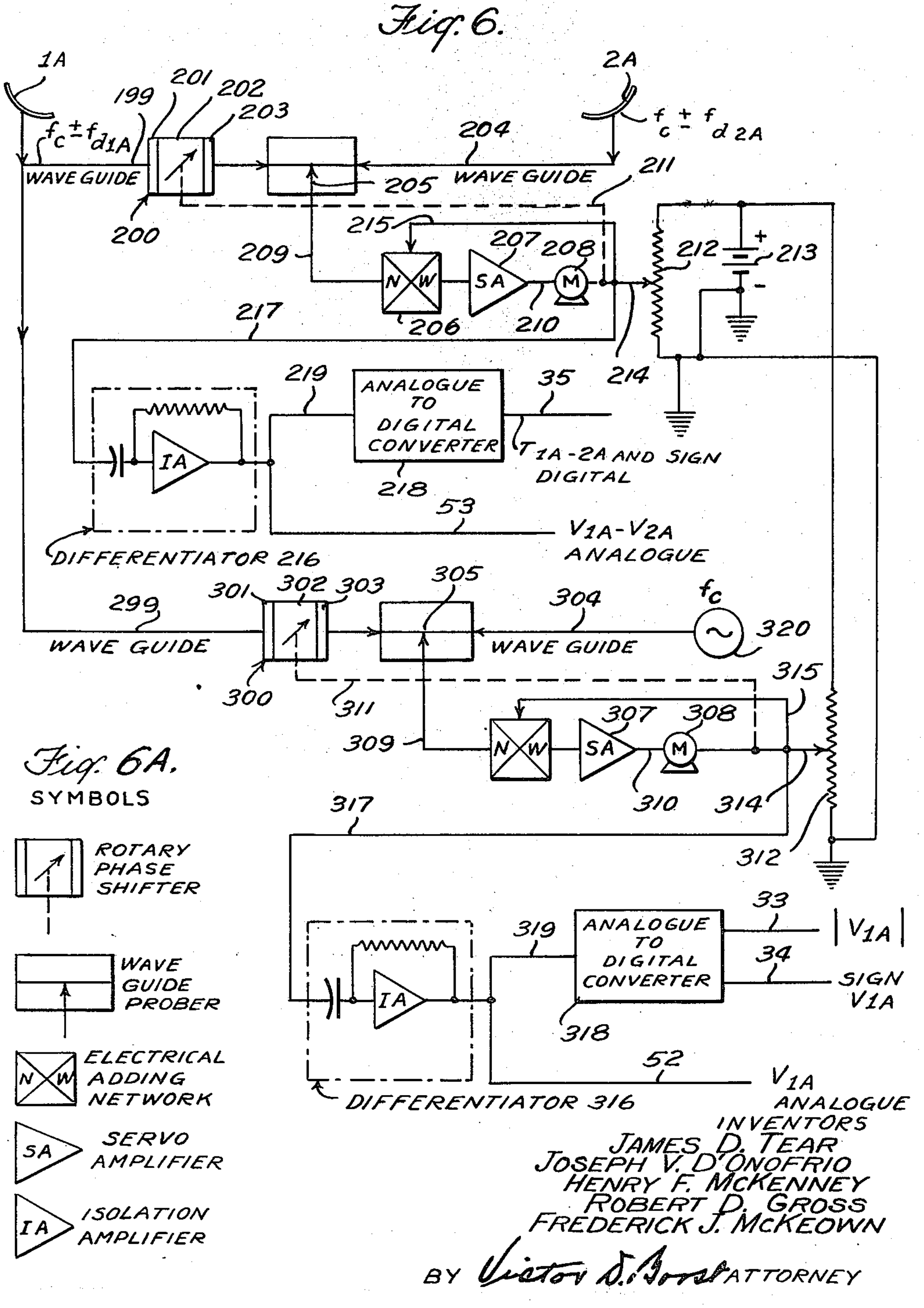
Fig. 6 is a schematic and block diagram of another embodiment of the base line equipment in Fig. 4.
Fig. 6*a* is an explanatory diagram showing the block symbols used in Fig. 6.

Another embodiment of the A-Base line equipment 30 of Fig. 4 is shown in Fig. 6. In the disclosed standing wave measuring system, antenna 1A which received the frequency $(f_c \pm f_{d1A})$ is connected by a wave guide 199 to one end section 201 of a variable microwave phase shifter 200 having a center section 202 and another end section 203, the phase shifter being capable of advancing or retarding a standing microwave by any angle in a continuous manner through any number of cycles. The phase shifter 200 consists of three sections of round wave guide, each section containing a plate of dielectric material (not shown). The middle round wave guide 202 is free to rotate while the end sections 201 and 203 are fixed. The first section 201 converts the linearly polarized wave from antenna 1A into a clockwise polarized wave. The center section converts the clockwise polarized wave into a counterclockwise circularly polarized wave and delays the signal in accordance with its angular position. The third section 203 restores the wave to linear polarization and is connected through a wave guide 204 to the antenna 2A which received the frequency $(f_c \pm f_{2A})$. A probe 205 inserted in the wave guide 204 provides a null sensing element for a follow-up servo system comprising an electrical adding network 206, a servo-amplifier 207 and a servomotor 208, one input of the adding network 206 being connected to the probe 205 by a conductor 209. The output side of the adding network 206 is connected to the servomotor 208 through a servoamplifier 207 by cable 210. The output shaft 211 of servomotor 208 drives the shaft of the rotary phase shifter 200 and the shaft of a potentiometer 212, the potentiometer 212 being connected across a D.C. reference voltage 213. Slider 214 of potentiometer 212 is connected to the other input of adding network 206 by a conductor 215 and to the input of a differentiator 216 by a conductor 217. During the flight of missile 22, the servomotor 208 will constantly adjust the rotary phase shifter so as to maintain a null point at probe 205. The movement of servomotor shaft 211 varies the output of the potentiometer 212. As the output of this potentiometer is connected to the input of the differentiator 216, the output of the latter device will contain the analog quantity $(V_{1A}-V_{2A})$ which is placed in the analog computer 51 by the connection 53. If it is desirable to operate the digital computer 50 for Ballistic Data recording, an analog-to-digital converter 218 is connected to the output of differentiator 216 by a cable 219. The output of the converter 218 has the digital information $T_{1A-2A}$ for the digital computer 50. In order to obtain the analog and digital output for the radial velocity $V_{1A}$, a wave guide 299, a rotary phase shifter 300, a wave guide 304, a probe 305, an adding network 306, a servoamplifier 307, a servomotor 308, a potentiometer 312 and a differentiator 316 are interconnected identically as are components 199, 200, 204, 205, 206, 207, 208, 212 and 216, respectively. Wave guide 299 is connected to antenna 1A and wave guide 304 is connected to an oscillator 320 having a frequency $f_c$ equal to the frequency of the oscillator 20 in the airborne missile 22. The output of the differentiator 316 will contain the analog quantity $V_{1A}$ for the analog computer 51. If it is desirable to also operate digital computer 50 for Ballistic Data recording, an analog-to-digital converter 318 is connected to the output of differentiator 316 by a cable 319. The output of the converter 318 has the digital information $V_{1A}$ and sign of $V_{1A}$ which are introduced to the computer 50 by cable connections 33 and 34, respectively.

Figs. 7*a*, 7*b*, 7*c*, 7*d* and 7*e* are block diagram representations of the analog computer 51 in Fig. 4, the computer receiving the input analog quantities R, $\theta$, $\phi$, $V_{1A}$, $(V_{1A}-V_{2A})$, $V_{1B}$ and $(V_{1B}-V_{2B})$ in the cables 74, 75, 76, 52, 53, 54 and 55, respectively, and yielding the desired intelligence $V_x$, $V_y$ and $V_z$ in accordance with the following formula which are above derived:

$$V_x=A+V_R \cos\phi \sin\theta$$

$$V_y=B+V_R \cos\phi \cos\theta$$

$$V_z=V_R \sin\phi-\frac{1}{\sin\phi}(A \cos\phi \sin\theta+B \cos\phi \cos\theta)$$

wherein:

$$A=(V_{1B}-V_{2B})\left[\frac{R}{2L}-\frac{1}{2}\cos\phi \sin\theta\right]$$

$$B=(V_{1A}-V_{2A})\left[\frac{R}{2L}-\frac{1}{2}\cos\phi \cos\theta\right]$$

$$V_R=\frac{V_{1A}+V_{2A}+V_{1B}+V_{2B}}{4}$$

Figures 7A, 7B, 7C, 7D, 7E:
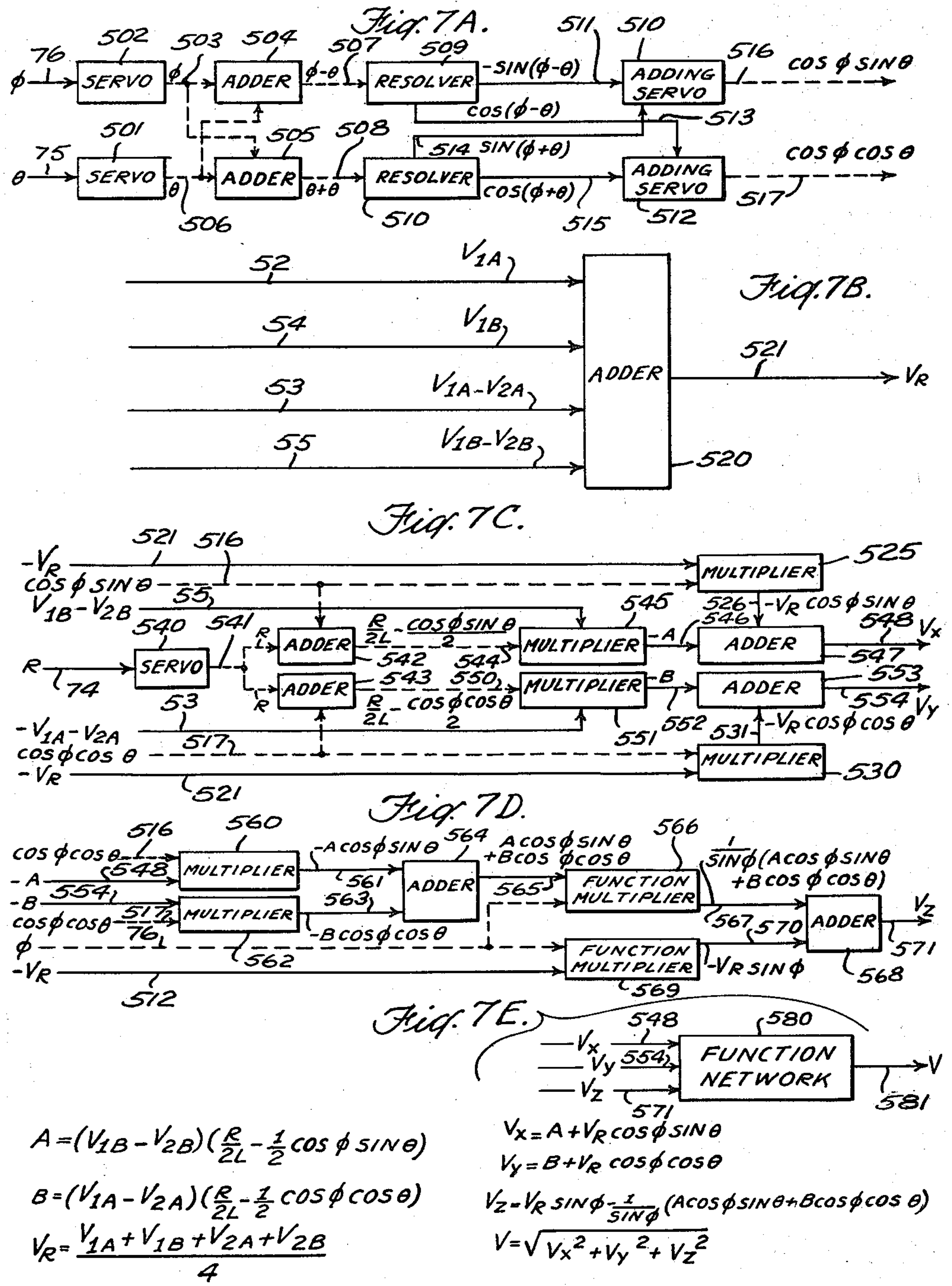

Referring to Fig. 7*a*, the cables 75 and 76 having the information quantities of azimuth angle $\theta$ and elevation angle $\phi$ of the missile 22 are connected to a coarse-fine-servomechanism system 501 and 502, respectively. The output shaft 503 of servomechanism system 502 is operatively connected to drive one input shaft of adders 504 and 505 while the output shaft 506 of servomechanism system 501 is operatively connected to drive the other input shaft of adders 504 and 505. Adder 504 subtracts the displacements of its two input shafts 503 and 506 to yield a displacement of its output shaft 507 equal to $(\phi-\theta)$. Adder 505 adds the displacements of its two input shafts 503 and 506 to yield a displacement of its output shaft 508 equal to $(\phi+\theta)$. Shafts 507 and 508 are operatively connected to drive the shafts of resolvers 509 and 510, respectively. One electrical output of resolver 509 having the information $-\sin(\phi-\theta)$ is connected to an adding servomechanism system 510 by a cable 511 and the other output of resolver 509 having the information cos $(\phi-\theta)$ is connected to an adding servomechanism 512 by a cable 513. One electrical output of the resolver 510 having the information sin $(\phi+\theta)$ is connected to adding servomechanism system 510 by a cable 514 and the other electrical output of resolver 510 having the information cos $(\phi+\theta)$ is connected to the adding servomechanism 512 by a cable 515. When the servomechanism systems reach equilibrium, shaft 516 of adding servomechanism 510 will displace in proportion to the computation quantity (cos $\phi$ sin $\theta$) and shaft 517 of adding servomechanism 512 will displace in proportion to the computation quantity (cos $\phi$ cos $\theta$).

In Fig. 7*b*, an adder 520 is connected at its input side to the cables 52, 53, 54 and 55 having informational quantities $V_{1A}$, $(V_{1A}-V_{2A})$, $V_{1B}$ and $(V_{1B}-V_{2B})$, respectively, the adder 520 yielding the computation quantity $V_R$ in cable 521.

In Fig. 7*c*, a multiplier 525 is connected at its input side to the cable 521 $(-V_R)$ and to the shaft 516 (cos $\phi$ sin $\theta$) for yielding $(-V_R \cos\phi \sin\theta)$ to cable 526. A multiplier 530 is connected at its input side to the cable 521 $(-V_R)$ and shaft 517 (cos $\phi$ cos $\theta$) to yield $(-V_R \cos\phi \cos\theta)$ to cable 531. The cable 74 having the range information R is connected to a servomechanical system 540. The output shaft 541 of servo 540 displaces in direct proportion to the range R and is operatively connected to and drives the shafts of adders 542 and 543. The other shafts of adders 542 and 543 are connected to shafts 516 (cos $\phi$ sin $\theta$) and 517 (cos $\phi$ cos $\theta$), respectively. The output shaft 544 of adder 542 having the informational quantity $$\left(\frac{R}{2L}-\frac{\cos\theta\sin\theta}{2}\right)$$

is connected to the cable 55 $(V_{1B}-V_{2B})$. The output of multiplier 545 in cable 546 has the computation quantity $(-A)$. An adder 547 connected at its input side to the cable 526 $(-V_R \cos\phi \sin\theta)$ and to the cable 546 $(-A)$ yields the computation quantity $V_x$ in a cable 548. The output shaft 550 of adder 543 having the informational quantity $$\left(\frac{R}{2L}-\frac{\cos\phi\cos\theta}{2}\right)$$

is connected to drive the shaft of a multiplier 551. The other input side of multiplier 551 is connected to the cable 53 $(V_{1A}-V_{2A})$. The output of multiplier 551 in the cable 552 has the computation quantity $(-B)$. An adder 553 connected at its input side to the cable 531 $(-V_R \cos\phi \cos\theta)$ and to the cable 552 $(-B)$ yields the computation quantity $V_y$ in a cable 554.

As shown in Fig. 7*d*, a multiplier 560 is connected at its input side to the cable 516 (cos $\phi$ sin $\theta$) and to the cable 548 $(-A)$ to yield the informational quantity $(-A \cos\phi \sin\theta)$ in its output cable 561. A multiplier 562 is connected at its input side to the cables 554 $(-B)$ and to the cable 517 (cos $\phi$ cos $\theta$) to yield the informational quantity $(-B \cos\phi \cos\theta)$ in its output cable 563. An adder 564 is connected at its input side to the cable 516 $(-A \cos\phi \sin\theta)$ and to the cable 563 $(-B \cos\phi \cos\theta)$ for yielding the informational quantity $(A \cos\phi \sin\theta + B \cos\phi \cos\theta)$ in its output cable 565. At its input side, a function multiplier 566 is connected to the cable 565 $(A \cos\phi \sin\theta + B \cos\phi \cos\theta)$ and to the shaft 76 $(\phi)$ to yield the computation quantity $$\left[\frac{1}{\sin\phi}(A\cos\phi\sin\theta+B\cos\phi\cos\theta)\right]$$

in its output cable 567. The cable 567 is connected to one input of an adder 568. A function multiplier 569 is connected at its input side to the shaft 76 $(\phi)$ and to the cable 512 $(-V_R)$ to yield the computation quantity $(-V_R \sin\phi)$ to its output cable 570. The cable 570 is connected to the other input of the adder 568 and adder 568 yield the computation quantity $V_z$ to its output cable 571.

As shown in Fig. 7*e*, cable 548 having the computation quantity $V_x$, cable 554 having the computation $V_y$, and cable 571 having the computation quantity $V_z$ are connected to the input side of a function network 580, the function network yielding a solution in accordance with the equation $V=V_x^2+V_y^2+V_z^2$. A cable 581 connected to the output side of function network 580 has the information quantity V, V being the resultant velocity of missile 22 relative to the base line origin O.

It is to be understood that various modifications of the invention other than those above described may be effected by persons skilled in the art without departing from the principle and scope of the invention as defined in the appended claims.

What is claimed is:

1. A missile velocity measuring system comprising a transmitting antenna and an oscillator adapted to be disposed on an airborne missile, said transmitting antenna being connected in driven relation to said oscillator, a first and second pair of antennas at a ground station location, a base line equipment device connected to each pair of antennas for measuring the radial velocity of said oscillator relative to one antenna in each pair of antennas and for measuring the difference in the radial velocities of said oscillator relative to the two antennas of each pair of antennas, radar means having a radar antenna at the said ground station location for providing the range, elevation angle and azimuth angle of said oscillator, and computing means connected to the base line equipment devices and to said radar means for yielding the velocity of said oscillator.

2. A missile velocity measuring system comprising a transmitting antenna and an oscillator adapted to be disposed on an airborne missile, said transmitting antenna being connected in driven relationship to said oscillator, a first and second pair of antennas at a ground station location, each of said pairs of antennas being disposed along one of two mutually perpendicular base lines having an intersection point 0, each antenna being spaced at a distance L from the said point 0, a base line equipment device connected to each pair of antennas for measuring the radial velocity of said oscillator relative to one antenna in each pair of antennas and for measuring the difference in the radial velocities of said oscillator relative to the two antennas of each pair of antennas, radar means having a radar antenna at the side ground station location for providing the range (R), elevation angle $(\phi)$ and azimuth angle $(\theta)$ of said oscillator, and computing means connected to the base line equipment means and to said radar means for yielding the rectangular velocity components $V_x$, $V_y$ and $V_z$ of the said oscillator in accordance with the mathematical relationship:

$$V_x=A+V_R\cos\phi\sin\theta,$$
$$V_y=B+V_R\cos\phi\cos\theta \text{ and}$$

$$V_z=V_R\sin\phi-\frac{1}{\sin\phi}(A\cos\phi\sin\theta+B\cos\phi\cos\theta)$$

wherein:

$$A=(V_{1B}-V_{2B})\left[\frac{R}{2L}-\frac{1}{2}\cos\phi\sin\theta\right]$$

$$B=(V_{1A}-V_{2A})\left[\frac{R}{2L}-\frac{1}{2}\cos\phi\cos\theta\right]$$

$$V_R=\frac{V_{1A}+V_{2A}+V_{1B}+V_{2B}}{4}$$

and $V_{1A}$ is the radial velocity of said oscillator relative to one antenna in one pair of antennas;

$V_{2A}$ is the radial velocity of said oscillator relative to the other antenna in said one pair of antennas;

$V_{1B}$ is the radial velocity of said oscillator relative to one antenna in the other pair of antennas;

$V_{2B}$ is the radial velocity of said oscillator relative to the other antenna in said other pair of antennas.

3. A missile velocity measuring system as claimed in claim 1 wherein said each base line equipment device includes a first mixer connected to one antenna of one pair of antennas, a second mixer connected to the other antenna of said one pair of antennas, a first local oscillator connected in beating relationship to the said first mixer, a third mixer connected to the output side of the said first mixer, a second bias oscillator connected in beating relationship to the said third mixer, a first counter means connected to the output side of said third mixer for measuring the radial velocity of said oscillator relative to said one antenna of said one pair of antennas, said first mixer being also connected in beating relationship to the said second mixer, a second counter means connected to the output side of said second mixer for measuring the difference in the radial velocities of said oscillator relative to each antenna in said one pair of antennas.

4. A missile velocity system as claimed in claim 3 wherein said first and second counter means are adapted to yield digital and analogue outputs and said computing means includes a digital computer connected to the digital output of said first and said second counter means and analog computer connected to the analog output of said first and said second counter means.

5. A missile velocity measuring system as claimed in claim 4 wherein each base line equipment means includes a fourth mixer, a first amplifier connected in driven relationship to said fourth mixer, said fourth mixer and said first amplifier being in the said connection between said first mixer and its associated antenna, a second amplifier in the said connection between said first and said third mixers, a third amplifier in the said connection between said third mixer and said first counting means, a fifth mixer, a fourth amplifier connected in driven relationship to said fifth mixer, a sixth mixer connected to the output side of said fourth amplifier, a first local oscillator connected in beating relationship to said sixth mixer, a fifth amplifier connected in driven relationship to the said sixth mixer, the said fourth amplifier, the said sixth mixer and the said fifth amplifier being in the said connection between the said second mixer and its associated antenna, a sixth amplifier in said connection between said second mixer and the said second counting means, and a second local oscillator connected in beating relationship to the said fourth and said fifth mixers.

6. A missile velocity measuring system as claimed in claim 5 wherein the said connection between the said radar means the said computing means includes a parallax correcting means for correcting the range, azimuth angle and elevation angle as measured at the location of said radar antenna to the true range, azimuth angle and elevation angle of the said oscillator relative to the said point 0.

7. A missile velocity measuring system as claimed in claim 6 wherein said analog computer comprises a first adder connected to the analog output of said first and said second counting means of the pair of base line equipment devices for yielding the computation quantity $V_R$, resolving means connected to said parallax correction means for obtaining a first resolved computation quantity $\cos\phi \sin\theta$ and a second resolved computation quantity $\cos\phi \cos\theta$, a first means connected to said resolving means, the said parallax correcting means and each of said counting means of said pair of equipment devices for obtaining the said computation quantity A and the said computation quantity B, a first multiplier connected at its input side of said first adder and said resolving means for obtaining the computation quantity $V_R \cos\phi \sin\theta$, a second adder connected at its input side to said first multiplier and said first means for obtaining the computation quantity $V_x$, a second multiplier connected at its input side to said first adder and said resolving means for obtaining the computation quantity $V_R \cos\phi \cos\theta$, a third adder connected at its input side to said first means and said second multiplier for obtaining the computation quantity $V_y$, a second means connected to said first means, said resolving means and said parallax correcting means for obtaining the computation quantity $$\left[\frac{1}{\sin\phi}(A \cos\phi \sin\theta + B \cos\phi \cos\theta)\right]$$

a third means connected to said first adder and said parallax correcting means for obtaining the computation quantity $V_R \sin\phi$, and a fourth adder connected at its input side to said second means and said third means for obtaining the computation quantity $V_z$.

8. A missile velocity measuring system as claimed in claim 1 wherein each base line equipment device includes a rotary phase shifter, a first wave guide connected between one antenna of one pair of antennas and said rotary phase shifter, a second wave guide connected between the other antenna of said one pair of antennas and the other side of said first rotary phase shifter, a probe disposed in said second wave guide, nulling means connected in controlling relationship to said phase shifter and in controlled relationship to said probe for maintaining a null at said probe, a variable voltage source connected in controlled relationship to said phase shifter and a differentiator connected across said variable voltage source.

9. A missile velocity measuring system as claimed in claim 8 wherein each base line equipment device includes a second rotary phase shifter, a third wave guide connected between said one antenna of said one pair of antennas and said rotary phase shifter, a second oscillator having a frequency equal to the first mentioned oscillator, a fourth wave guide connected between said second oscillator and said second rotary phase shifter, a second probe disposed in said fourth wave guide, a second nulling means connected in controlling relationship to said second phase shifter and in controlled relationship to said second probe for maintaining a null at said second probe, a second variable voltage source connected in controlled relationship to said second phase shifter and a second differentiator connected across said second variable voltage source.

10. A missile velocity measuring system as claimed in claim 1 wherein each base line equipment means comprises a first rotary phase shifter, a first wave guide connected between one antenna of said one pair of antennas and said first rotary phase shifter, a second wave guide connected between the other antenna of said pair of antennas and the other side of said first rotary phase shifter, a first probe disposed in said second wave guide, a first adding network, one input side of said first adding network being connected to said first probe, a first servomotor connected in driven relationship to said first adding network, a D.C. voltage source, a first potentiometer connected across said D.C. voltage source, said first servomotor being operatively connected to said first rotary phase shifter and to said first potentiometer for driving a first differentiator, said first potentiometer being connected in driving relationship to said other input side of said first adding network and to said first differentiator, a second phase shifter, a third wave guide connected between said one antenna of said one pair of antennas and said second phase shifter, a second oscillator having a frequency equal to the first mentioned oscillator, a fourth wave guide connected between said second oscillator and said second phase shifter, a second probe disposed in said fourth wave guide, a second adding network, one input side of said second adding network being connected to said second probe, a second servomotor connected in driven relationship to said second adding network, a second potentiometer connected across said D.C. voltage source, said second servomotor being operatively connected to drive said second rotary phase shifter and said second potentiometer, and a second differentiator, said second potentiometer being connected in driving relationship to said other input side of said second adding network and to said second differentiator.

No references cited.